United States Patent [19]

Mathis et al.

[11] 4,059,653
[45] Nov. 22, 1977

[54] ANTISTATIC DYEABLE POLYAMIDE COMPOSITION

[75] Inventors: Ronald D. Mathis, Taylors; James S. Dix, Greenville, both of S.C.

[73] Assignee: Phillips Petroleum Company, Bartlesville, Okla.

[21] Appl. No.: 690,806

[22] Filed: May 27, 1976

[51] Int. Cl.$^2$ .............................................. C08L 77/00
[52] U.S. Cl. .................. 260/857 PG; 260/45.85 S; 260/45.95 R; 260/78 SC; 260/857 PE
[58] Field of Search .................. 260/857 PE, 857 PG

[56] References Cited

U.S. PATENT DOCUMENTS

| | | | |
|---|---|---|---|
| 3,787,523 | 1/1974 | Crescentini | 260/857 PG |
| 3,787,524 | 1/1974 | Crescentini | 260/857 PG |
| 3,859,380 | 1/1975 | Crescentini | 260/857 PG |
| 3,876,725 | 4/1975 | Wells | 260/857 PG |
| 3,882,190 | 5/1975 | Wells | 260/857 PG |
| 3,887,644 | 6/1975 | Wells | 260/857 PG |
| 3,888,944 | 6/1975 | Crescentini | 260/857 PG |
| 3,923,924 | 12/1975 | Wells | 260/857 PG |

OTHER PUBLICATIONS

Brit. 856,917: Chemical Abstracts, vol. 55, pp. 18, 179b, 1961.
Belg. 669,571: Chemical Abstracts, vol. 65, p. 7349g, 1966.
Japan 72 30,748: Chemical Abstracts, vol. 78, Abstract No. 56,697w, 1973.

*Primary Examiner*—Paul Lieberman

[57] ABSTRACT

In polyamide compositions containing the reaction product of (1) a block copolymer of propylene oxide, ethylene oxide, and an alkylene diamine and (2) a dicarboxylic acid ester in an amount sufficient to provide improved antistatic characteristics to the polyamide, the apparent dyeability can be increased by including in said polyamide composition a sufficient amount of at least one zinc sulfinate of the formula:

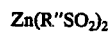

$$Zn(R''SO_2)_2$$

wherein R'' is an alkyl group containing from 4 to 20 carbon atoms.

36 Claims, No Drawings

ANTISTATIC DYEABLE POLYAMIDE COMPOSITION

This invention relates to polyamide compositions. In another aspect, this invention relates to polyamide compositions containing an antistatic agent. In a further aspect this invention relates to an additive that can be employed to increase the apparent dyeability of polyamide compositions containing certain antistatic agents.

Among the antistatic agents disclosed in French Pat. No. 2,151,035 to BASF Wyandotte Corporation are those obtained when the product resulting from the condensation of ethylene oxide, propylene oxide and an alkylene diamine, such as ethylene diamine is reacted further with a dicarboxylic acid ester.

It has been discovered that when polyamides containing such antistatic agents are dyed they appear to have received less dye than polyamides not containing such antistatic agents even though the amount of dye contained may be the same. Stated differently, it has been observed that when such antistatic agents are employed the depth of the color obtained upon dyeing is less than that obtained for polyamides not containing such antistatic agents. Stated in still a different manner, such antistatic agents have been discovered to have an adverse effect upon the apparent dyeability. The term "apparent dyeability" is used herein to indicate the visible depth of dyeing.

Accordingly, an object of this invention is to improve the depth of color that can be obtained when dyeing polyamide compositions containing such antistatic agents.

Another object is to provide polyamide compositions containing such antistatic agents, which compositions when dyed will appear to have received more dye than other polyamide compositions containing such antistatic agents.

Other objects and advantages of this invention will be apparent to those skilled in the art upon reading this disclosure.

According to this invention, the apparent dyeability of a polyamide composition of the type above mentioned can be improved by employing a sufficient amount of at least one zinc alkyl sulfinate. The zinc additive is particularly beneficial for improving the apparent dyeability when such polyamide compositions are dyed with acid dyes. A similar effect is envisioned for any dye that is generally used in the dyeing of polyamides.

The polyamides with which this invention is concerned are well known in the art as being characterized by the presence of recurring carbonamide groups —CONH as an integral part of the polymer chain and wherein such groups are separated by at least two carbon atoms. Normally, these polymers are prepared by the polymerization of lactams or by the polycondensation of aminocarboxylic acids or of diamines and dicarboxylic acids. Exemplary polymers include polycaprolactam, poly(aminodecanoic acid), poly(pyrrolidone), poly(hexamethylene adipamide), poly(hexamethylene sebacamide), and poly(hexamethylene terephthalamide), and the like. This invention relates particularly to normally solid fiber-forming polyamides but includes nonfiber-forming polyamides as well as liquid polyamides. This invention can also be applied to blends of polyamides as well as to copolyamides. In general, this invention is directed to any polyamide compositions which have their apparent dyeability adversely affected by the type of antistatic agents described above.

When the polyamides are to be employed for forming fibers, the polymerization is usually continued until the material has polymerized to a fiber-formable stage. The polymers thus obtained have high melting points and can be cold drawn to form strong highly oriented fibers. The diamines, dicarboxylic acids, and amide-forming derivatives thereof which can be used as reactants to yield the fiber-forming polyamides are well known in the art. Suitable diamines include, for example, those represented by the general formula:

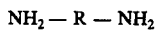
$$NH_2 - R - NH_2$$

in which R is a divalent hydrocarbon radical having from 2 to 20 carbon atoms. Representative examples are ethylene diamine, propylene diamine, tetramethylene diamine, pentamethylene diamine, hexamethylene diamine, octamethylene diamine, 2-ethyl-1,18-octadecamethylene diamine, and decamethylene diamine. Well known dicarboxylic acid reactants include those represented by the general formula:

$$HOOCRCOOH$$

in which R is as defined above. These dicarboxylic acids may be illustrated by succinic acid, sebacic acid, octadecanedioic acid, adipic acid, suberic acid, azelaic acid, undecanedioic acid, glutaric acid, pimelic acid, brassylic acid, tetradecanedioic acid, terephthalic acid, eicosanedioic acid, and isopthalic acid.

In place of the above-noted dicarboxylic acids and diamines those skilled in the art recognize that the amide-forming derivatives thereof can be employed to form fiber-forming polymers. Amide-forming derivatives of the diamines include the carbamates and N-formyl derivative. Amide-forming derivatives of the dibasic carboxylic acids comprise the mono- and diester, the anhydride, and mono- and diamide, and the acid halide.

In addition to the above diamines and dicarboxylic acids and their derivatives, it is also known in the art that the polymamides may be prepared from certain of the amino acids. The amino acids are represented by the general formula:

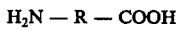
$$H_2N - R - COOH$$

in which R is as defined above. Illustrative examples of these amino acids are 6-aminocaproic acid, 7-aminoheptanoic acid, 8-aminooctanoic acid, 9-aminononanoic acid, 10-aminodecanoic acid, 11-aminoundecanoic acid, 12-aminododecanoic acid, 13-aminotridecanoic acid, and 20aminoeicosanoic acid. Also the lactams of these amino acids may be used as monomers from which the polyamides of the present invention may be prepared. These types of polyamides are included in the scope of the polyamides with which this invention is concerned.

In addition to the homopolyamides, copolyamides and terpolyamides are also contemplated and are within the scope of this invention. It is known in the art that copolyamides and terpolyamides can be obtained employing mixtures of diamines and dibasic acids, with the total diamines being present in substantially equimolar proportions to the total dibasic acids present during the polymer-forming reaction. Co- and terpolymeric products may be formed directly from the corresponding monomers, or one or more homopolymers may be added to the polymerizable reactants, distribution of the desired units entering the products via amide interchange. Formation of the desired diamine salts of the various dibasic acids prior to melt polymerization assists in control of the reaction. The conventional polyamide melt polymerization cycle is suitable.

As stated above, this invention is related to polyamide compositions containing as an antistatic agent a product resulting when the condensation product of ethylene oxide, propylene oxide, and alkylene diamine is reacted further with at least one dicarboxylic acid ester.

The block copolymers of propylene oxide, ethylene oxide, and alkylene diamine that are employed in preparing the antistatic agent with which this invention is concerned comprise at least one compound represented by the general formula:

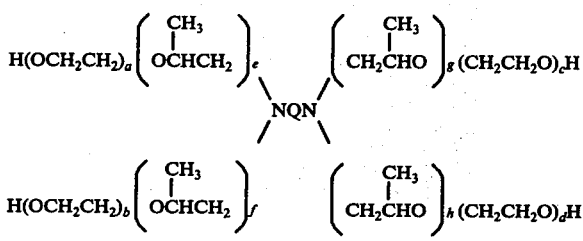

where $a$, $b$, $c$, $d$, $e$, $f$, $g$, and $h$ are each a whole number and the total of $a$, $b$, $c$, and $d$ is between 8 and 1,000 and the total of $e$, $f$, $g$, and $h$ is between 8 and 850 and Q is an alkylene radical containing 1 to 13 carbon atoms. The term "whole number" as used herein refers to zero or any positive integer. The block polymers shown in the formula are often referred to as tetrol compounds. That terminology will be used in this application. Suitable tetrol compounds are commercially available (BASF Wyandotte) under the trademark Tetronic as a series of the poly(oxyethylene)-poly(oxypropylene) block copolymers having molecular weights ranging from about 1650 to about 135,000. The chain lengths of the poly(oxyethylene) and the poly(oxypropylene) moieties vary in this series. For use as an antistatic agent in polyamide generally the ethylene oxide moieties make up from about 10 to about 90 weight percent of the tetrol compound.

In the context of the instant invention, the molecular weights of the preferred tetrol compounds range from about 4,000 to about 50,000 and the ethylene oxide moiety contents preferably range from about 20 to about 80 weight percent of the compounds.

The preparation of some of the tetrol compounds employed in preparing the antistatic agent is shown in U.S. Pat. No. 2,979,528. The disclosure of that patent is incorporated herein by reference.

As pointed out in the above-mentioned French patent, the tetrol compounds can be prepared under standard oxyalkylation conditions, for example at pressures in the range of 2.39 to 6.33 kg/cm², a temperature in the range of 100° to 175° C., in the presence of a conventional oxyalkylation catalyst.

The dicarboxylic acid esters reacted with the tetrol compounds to prepare the antistatic agents with which this invention is concerned can be represented by the general formula

R'OOC — A — COOR' wherein A is a valence bond or a divalent hydrocarbyl radical having 1 to 8 carbon atoms and each R' is an alkyl group containing 1 to 4 carbon atoms or a hydroxyalkyl group containing 2 to 4 carbon atoms. The R' radicals can be the same or different.

Acyclic aliphatic dicarboxylic acid esters that would be suitable for the preparation of the antistatic agent would include, for example, dimethyl oxalate, diethyl malonate, methyl propyl succinate, dimethyl adipate, (2-hydroxyethyl) methyl pimelate, bis(2-hydroxypropyl) suberate, bis(2-hydroxy-n-butyl) sebacate and mixtures of any two or more thereof.

Cycloaliphatic dicarboxylic acid esters which can be used in the preparation of the antistatic agents would include, for example, dimethyl cyclopropanedicarboxylate, bis(2-hydroxypropyl) 1,4-cyclohexanedicarboxylate, bis(t-butyl) 1,6-cyclooctanedicarboxylate and mixtures of any two or more thereof.

Typical aromatic dicarboxylic acid esters that can be employed in preparing the antistatic agent include, for example, diethyl phthalate, methyl ethyl isophthalate, dimethyl terephthalate, and the like and mixtures of any two or more thereof.

The antistatic agent is prepared by reacting the dicarboxylic acid ester with the tetrol compound in a respective molar ratio in the range of about 0.5/1.0 to about 1.0/1.0, and preferably in the range of about 0.7/1.0 to about 0.95/1.0, commonly in an inert atmosphere, at a temperature in the range of about 60° to about 160° C., at either about atmospheric or a reduced atmospheric pressure, for a period of time in the range of about 1 to about 4 hours. The reaction is preferably carried out at a reduced pressure at a temperature in the range of 70° to 150° C. for a period of time in the range of 1 to 2 hours.

In preparing the antistatic agent a catalyst may be employed. Suitable catalysts are transesterification catalysts, such as, for example, sodium hydroxide, potassium hydroxide, etc. The catalyst is used, of course, in catalytic quantities, and in general the amount of catalyst will be in the range of about 0.01 to about 0.2 part per 100 parts by weight of reactants. When a transesterification catalyst is used, it is necessary to neutralize any residual quantity of catalyst by conventional methods after completion of the reaction. The product of this reaction will generally have characteristics in the range of a viscous liquid to a hard wax. The hard wax, when heated or subjected to elevated temperatures, is converted into a highly viscous liquid, which, by way of illustration, will have a viscosity at 100° C. of between 200 and 40,000 centipoises, the same viscosity range applying in the case when liquid products are obtained.

The zinc alkyl sulfinate compounds employed in this invention are those of the formula:

Zn(R"SO$_2$)$_2$ wherein R" is an alkyl group containing from 4 to 20 carbon atoms. Examples of zinc alkyl sulfinates falling within this formula include zinc 1-butanesulfinate, 2-methyl-2-propanesulfinate, zinc 2-butanesulfinate, zinc 1-octanesulfinate, zinc 2-octanesulfinate, zinc 1-dodecanesulfinate, zinc 1-eicosanesulfinate, and the like, and mixtures of any two or more thereof.

The zinc alkyl sulfinate employed in this invention can be prepared by techniques known to those skilled in the art. For example, they can be prepared by using zinc dust to reduce alkyl sulfonyl chlorides wherein the alkyl group contains 4 to 20 carbon atoms. The alkyl sulfonyl chlorides can be prepared by reacting sulfonyl chloride with the corresponding alkyl sulfonic acids or by reacting the sodium salt of the corresponding acid with phosphorus trichloride or phosphorus pentachloride. The alkyl sulfonic acids can be prepared as known in the art by direct sulfonation of the paraffin, by oxidation of the mercaptan, and by alkylation of a sulfite.

The above-described zinc alkyl sulfinate is used in the polyamide compositions of this invention in an amount such that when the polyamide composition is dyed the K/S value (to be explained shortly) is greater than that which would be observed if the composition did not contain any of the above-described zinc alkyl sulfinate. Generally, the amount of the above-described zinc alkyl sulfinate that is employed will be in the range of about 0.02 to about 2.5 weight percent, more preferably in the range of about 0.05 to about 1.5 weight percent, based on the weight of the polyamide plus the antistatic agent.

Antioxidants of the hindered phenol type can also be present in the compositions. Examples of such antioxidants include 2,6-di-t-butyl-4-methylphenol, octadecyl[3-(3,5-di-t-butyl-4-hydroxyphenyl)] propionate, di-n-octadecyl(3,5-di-t-butyl-4-hydroxybenzyl) phosphonate, tetrakis[methylene(3,5-di-t-butyl-4-hydroxyhydrocinnamate)] methane, 1,3,5-trimethyl-2,4,6-tris(3,5-di-t-butyl-4-hydroxybenzyl)benzene and tris(3,5-di-t-butyl-4-hydroxybenzyl)isocyanurate. When used, the antioxidant will be employed in an amount effective for protecting the polymer against oxidation. Generally, the amount of antioxidant will be in the range of about 0.02 to about 2 weight percent, more preferably about 0.05 to about 0.5 weight percent, based on the weight of polyamide plus antistatic agent.

The antistatic agent is employed in an amount which will result in a polyamide less likely to develop static charge. Generally, the antistatic agent is used in amounts in the range of about 1 to about 12 weight percent, more preferably 2 to about 8 weight percent, based on polyamide plus antistatic agent.

Preferably, the zinc alkyl sulfinate is added to a melt of the antistatic agent and the resulting composition is then added to the polyamide. However, the zinc compound and the antistatic agent can be added to the materials which are reacted to form the polyamide; or the zinc compound can be blended into molten polyamide before or after the blending in of the antistatic agent.

The polyamide compositions of this invention may be modified by the addition of any other materials known in the art, for example, dyes, plasticizers, resins, waxes, fillers, pigments, delusterants, nucleating agents, and the like. Of course, it is not advisable to employ additives which have an antagonistic effect on the properties that the instant inventive composition is intended to provide.

The improved polyamide compositions of this invention can be converted into any of the forms suitable for polyamides generally, such as fibers, yarns, tire cord, bristles, fabric, molded articles, films, and coatings for filaments, textiles, wood, leather, ceramics, and the like.

The polyamide compositions of this invention when subjected to dyeing will yield compositions that have greater depth of color than similar compositions which do not contain zinc alkyl sulfinate as described.

The invention will now be further described in the following specific examples which are to be regarded solely as illustrative and not as restricting the scope of the invention.

EXAMPLE I

A typical antistatic agent useful in this invention designated herein as AS-1 was obtained from BASF Wyandotte. A typical preparation of such an antistatic agent involves placing in a suitable vessel 2120 grams of a normally solid tetrol compound having a molecular weight of about 20,000 and containing about 60 weight percent ethylene oxide moiety content with 2.1 grams of 90 percent pure potassium hydroxide dissolved in about 15 ml of methanol. The mixture is then heated with stirring at about 150° C. at a pressure of 2 mm Hg for one-half hour. The vacuum is replaced with a nitrogen atmosphere and 14.3 grams of dimethyl terephthalate is added (corresponds to about 0.7 mole diester per mole of tetrol compound). The mixture is heated to 145° C. with stirring and the pressure is reduced to 2 mm Hg for one hour, after which essentially all of the methanol has been distilled from the mixture. The remaining potassium hydroxide is then neutralized with 1.5 ml of 85 percent orthophosphoric acid, the water is removed at about 115° C. and the product is recovered. It consists of a normally solid, waxy material melting at about 50° C. and has a viscosity of 17,000 centipoises at 100° C.

EXAMPLE II

Another antistatic agent designated herein as AS-2 was obtained from BASF Wyandotte. In a typical preparation of such an antistatic agent, 3,040 grams of a liquid tetrol compound having a molecular weight of about 12,500 and an ethylene oxide moiety content of about 40 percent of the molecular weight and 3.2 grams of powdered potassium hydroxide is placed in a suitable vessel. The mixture in the vessel is then heated with stirring at about 120° C. at a pressure of 2 mm Hg until a substantially homogeneous mixture is obtained. The vacuum is then replaced with a nitrogen atmosphere and 40 grams of dimethyl terephthalate is added (i.e., about 0.7 mole of ester per mole of tetrol compound). The vacuum is reestablished and the mixture is again heated with stirring until a temperature of 145° C. is reached and the methanol formed begins to distill. The temperature is maintained for one hour at 145° C at which time no significant methanol distillation is observed. The remaining potassium hydroxide is then neutralized with 85 percent orthophosphoric acid, the water is removed at about 115° to 120° C. and the product recovered. The product is soft, waxy and has a viscosity of 1600 centipoises at 100° C.

EXAMPLE III

Polyamide fabrics were prepared from polyamide compositions free of antistatic agents or containing 4 weight percent of either AS-1 or AS-2, based on the weight of the polyamide plus antistatic agent. The effect of the antistatic agents on the depth of dyeing was determined by dyeing the fabrics and comparing with the correspondingly dyed polyamide fabric prepared from polyamide not containing any antistatic agent. In each run, the polyamide was fiber grade poly(hexamethylene adipamide) which had been dried under a vacuum for 20 hours at 100°-120° C. For each of these polyamide compositions containing the antistatic agents, the respective antistatic agent was tumbled with the necessary amount of polyamide until a uniform mixture was obtained. Each mixture was then pelletized by introducing it into a one inch extruder equipped with a 24:1 L/D screw at a melt temperature at the die entrance of 525° F. (274° C) and a one minute residence time. A nitrogen blanket was employed at the feed hopper. The resulting pelletized samples were dried for 20 hours at 100°–120° C. under vacuum. Each polyamide composition was spun in an experimental size piston extruder (⅝ inch diameter barrel) having a capacity of 20 grams through an attached 6 hole spinnerette die in which each orifice had a length/diameter ratio in mils of 12:9. Polymer throughput was 1 cc/minute and the melt temperature was 560° F. (293° C.). For each composition, the resulting fiber was 2 plied and drawn 3 to 1 (3X) at 330° F. (166° C.) to obtain a 6 denier per filament yarn consisting of 12 fibers having a total denier of 72. Knitted sample fabrics were prepared on a Lawson-Hemphill fiber analysis knitter using a 380 needle head and operated at a 3.5 meter head setting. Each knitted sample fabric was prescoured at 160° F. (71° C.) for 15 minutes, rinsed and then dyed with an acid dye for one hour at the boil and tumble dried. The following dyes were used: Merpacyl Blue 2GA (C.I. Acid Blue 40) and Lanasyn Brilliant Red RL (C.I. Acid Red 263). The first dye is a product of DuPont and the second dye is a product of Ciba. The dye level for the blue and red dyes was 1.5 and 2.5 weight percent, respectively, based upon the weight of the fiber. Depth of dyeing was determined by measuring the K/S value on a Diano/SSCE color eye (standard illuminant C) equipped with a Diano/LSCE Auto Mate system. The depth of color is approximately proportional to the K/S value, which is a measure of the light reflected from the dyed sample. The larger the K/S value, the deeper the shade, and a K/S value of 20 indicates that the shade is approximately twice as deep as the shade represented by a K/S value of 10. The determination of K/S values is set forth in an article by D. B. Judd, "Color in Business," Science and Industry, 1952, pages 314–342. The results are presented in Table I.

Table I
Effect of AS-1 and AS-2 on Dyeing of Polyamides

| Fabric No. | Antistatic Agent | K/S Values Merpacyl Blue 2GA[a] | Lanasyn Brilliant Red RL[b] |
|---|---|---|---|
| 1 | None | 10.3 | 17.7 |
| 2 | AS-1 | 7.8 | 13.6 |
| 3 | AS-2 | 9.7 | 16.5 |

[a]Recorded at 620 mµ (620 nm).
[b]Recorded at 520 mµ (520 nm).

Table I shows that both AS-1 and AS-2 have an adverse effect upon the dyeing of polyamide. The apparent dyeability or depth of dyeing is reduced by both.

EXAMPLE IV

Another series of polyamide compositions were prepared which demonstrate the advantage of adding zinc alkyl sulfinates as herein defined to polyamide compositions containing antistatic agents such as AS-1 or AS-2. As in Example III, each antistatic agent was used at a level of 4 weight percent based on the weight of the polyamide plus the weight of the antistatic agent.

The polyamide compositions employed that contained additives in addition to the antistatic agent were prepared by melting the necessary quantity of antistatic agent on a steam bath and then stirring into the melted antistatic agent any other additives employed to obtain a viscous mass. Each resulting melt was then cooled to give a slab of solid waxy material which was subsequently cut into small pieces and separately dried under vacuum for 15–20 hours at room temperature. Fiber grade poly(hexamethylene adipamide) in chip form was dried under vacuum for 20 hours at 100°–120° C. The polymer and the antistatic agent composition were kept sealed in a dry atmosphere until just prior to pelletization, at which time they were tumbled together to obtain a uniform mixture of the components. Each mixture was then pelletized, extruded into fiber, and plied into yarn as were the polyamide compositions of Example III. Likewise, sample fabrics were knitted, dyed, and analyzed for depth of dyeing as in Example III. The results are presented in Table II. In Table II ZDDS denotes zinc 1-dodecanesulfinate and AO denotes tetrakis[methylene(3,5-di-t-butyl-4-hydroxyhydrocinnamate)] methane, a hindered phenol-type antioxidant.

Table II
Effect of Zinc 1-Dodecanesulfinate on the Dyeing of Antistatic Polyamide

| Fabric No. | Antistatic Agent | Other Additives, Weight Percent[a] ZDDS | AO | K/S Values Merpacyl Blue 2GA[b] | Lanasyn Brilliant Red RL[c] |
|---|---|---|---|---|---|
| 4 | AS-1 | 0 | 0 | 8.8 | 15.0 |
| 5 | AS-1 | 0 | 0.1 | 8.1 | 14.5 |
| 6 | AS-1 | 0.3 | 0.1 | 9.0 | 15.2 |
| 7 | AS-2 | 0 | 0.1 | 8.6 | 15.4 |
| 8 | AS-2 | 0.3 | 0.1 | 10.2 | 16.6 |

[a]Weight percent based on weight of polyamide plus antistatic agent.
[b]Recorded at 620 mµ (620 nm).
[c]Recorded at 520 mµ (520 nm).

A comparison of the K/S values of fabrics 4 and 5 shows that the depth of dyeing was lower for the antistatic polyamide containing the antioxidant than for the antistatic polyamide containing no antioxidant. The K/S values obtained with fabric 6 shows that even in the presence of the antioxidant when zinc 1-dodecanesulfinate is employed the depth of dyeing is greater than that of the fabric of polyamide containing AS-1 and no antioxidant.

A comparison of the K/S values of fabrics 7 and 8 shows that zinc 1-dodecanesulfinate also improves the depth of dyeing of polyamides containing AS-2.

The foregoing examples have been provided merely to illustrate the instant invention and are not intended to limit the scope of the invention as described herein.

What is claimed is:

1. A polyamide composition prepared by admixing (A) a polyamide; (B) an antistatic agent comprising the reaction product of (1) at least one tetrol compound of the formula:

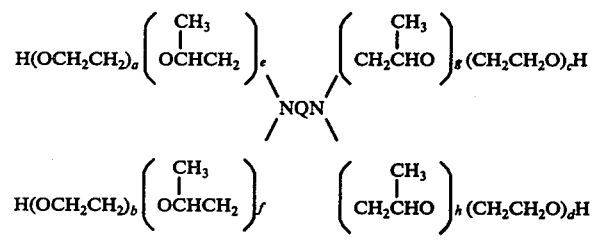

where $a$, $b$, $c$, $d$, $e$, $f$, $g$, and $h$ are each a whole number and the total of $a$, $b$, $c$, and $d$ is between 8 and 1,000 and the total of $e$, $f$, $g$, and $h$ is between 8 and 850, Q is an alkylene radical containing 1 to 13 carbon atoms, wherein the molecular weight of said tetrol compound is between about 1,650 and about 135,000 and said ($OCH_2CH_2$) moieties make up from about 10 to about 90 weight percent of said tetrol compound, and (2) at least one dicarboxylic acid ester having the formula R'OOC—A—COOR' wherein A is a valence bond or a divalent hydrocarbyl radical having from 1 to 8 carbon atoms and R' is an alkyl group containing 1 to 4 carbon atoms or a hydroxyalkyl group containing 2 to 4 carbon atoms, wherein the two R' radicals may be the same or different; and (C) at least one zinc alkyl sulfinate of the formula:

$$Zn(R''SO_2)_2$$

wherein R'' is an alkyl group containing from 4 to 20 carbon atoms; wherein the amount of antistatic agent is that which is sufficient to improve the antistatic characteristics of said polyamide and the amount of zinc alkyl sulfinate is such that when said polyamide composition is dyed with an acid dye, the K/S value will be greater than that which would be observed if the zinc alkyl sulfinate were not present in said polyamide composition.

2. A polyamide composition according to claim 1 wherein said zinc alkyl sulfinate is added to a melt of said antistatic agent and the resulting composition is compounded with the polyamide.

3. A polyamide composition according to claim 2 wherein said zinc alkyl sulfinate is employed in an amount in the range of about 0.02 to about 2.5 weight percent based on the weight of the polyamide plus the weight of the antistatic agent.

4. A composition according to claim 3 wherein said zinc alkyl sulfinate is zinc 1-dodecanesulfinate.

5. A composition according to claim 4 wherein the polyamide is poly(hexamethylene adipamide) and the antistatic agent is one prepared by reacting dimethyl terephthalate with a tetrol compound having an ethylene oxide moiety content of about 60 weight percent and a molecular weight of about 20,000.

6. A composition according to claim 5 wherein the amount of said antistatic agent is in the range of from about 1 to about 12 weight percent based on the weight of the polyamide and the antistatic agent.

7. A composition according to claim 6 which is a filament which has been dyed with an acid dye selected from Merpacyl Blue 2GA, Merpacyl Blue SW, and Lanasyn Brilliant Red RL.

8. A composition according to claim 4 wherein the polyamide is poly(hexamethylene adipamide) and the antistatic agent is one prepared by reacting dimethyl terephthalate with a tetrol compound having an ethylene oxide moiety content of about 40 weight percent and a molecular weight of about 12,500.

9. A composition according to claim 8 wherein the amount of antistatic agent is in the range of about 1 to about 12 weight percent based on the weight of the polyamide plus antistatic agent.

10. A composition according to claim 9 which is a filament which has been dyed with an acid dye selected from Merpacyl Blue 2GA, Merpacyl Blue SW, and Lanasyn Brilliant Red RL.

11. A composition according to claim 3 wherein there is also admixed with said polyamide, said antistatic agent and said zinc alkyl sulfinate, an antioxidant selected from the group consisting of 2,6-di-t-butyl-4-methylphenol, octadecyl[3-(3,5-di-t-butyl-4-hydroxyphenyl)] propionate, di-n-octadecyl(3,5-di-t-butyl-4-hydroxybenzyl) phosphonate, tetrakis[methylene(3,5-di-t-butyl-4-hydroxyhydrocinnamate)] methane, 1,3,5-trimethyl-2,4,6-tris(3,5-di-t-butyl-4-hydroxybenzyl) benzene and tris(3,5-di-t-butyl-4-hydroxybenzyl) isocyanurate, wherein said antioxidant is present in an amount of about 0.02 to about 2.0 weight percent based on the weight of the polyamide plus the antistatic agent.

12. In the forming of a polyamide composition by admixing ingredients comprising (A) a polyamide and (B) an antistatic agent comprising the reaction product of (1) at least one tetrol compound of the formula:

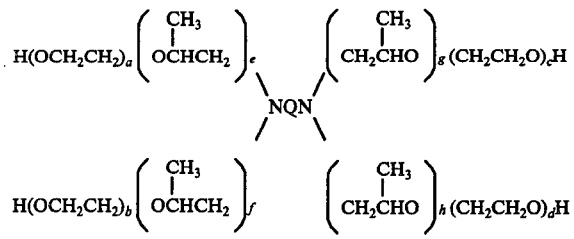

where a, b, c, d, e, f, g, and h are each a whole number and the total of a, b, c, and d is between 8 and 1,000 and the total of e, f, g, and h is between 8 and 850, Q is an alkylene radical containing 1 to 13 carbon atoms, wherein the molecular weight of said tetrol compound is between about 1,650 and about 135,000 and said ($OCH_2CH_2$) moieties make up from about 10 to about 90 weight percent of said tetrol compound, and (2) at least one dicarboxylic acid ester having the formula R'OOC—A—COOR' wherein A is a valence bond or a divalent hydrocarbyl radical having from 1 to 8 carbon atoms and R' is an alkyl group containing 1 to 4 carbon atoms or a hydroxyalkyl group containing 2 to 4 carbon atoms, wherein the two R' radicals may be the same or different; the method of obtaining a polyamide composition which when dyed with an acid dye will exhibit greater depth of dyeing than a composition consisting only of said polyamide and said antistatic agent, said method comprising employing as an ingredient in the forming of said polyamide composition at least one zinc sulfinate of the formula:

$$Zn(R''SO_2)_2$$

wherein R'' is an alkyl group containing 4 to 20 carbon atoms, said zinc alkyl sulfinate being employed in such an amount that when said polyamide composition is dyed the K/S value will be greater than that of a composition consisting only of said polyamide and said antistatic agent.

13. A method according to claim 12 wherein prior to being incorporated into said polyamide said antistatic agent is melted and said zinc alkyl sulfinate is blended with the melted antistatic agent.

14. A method according to claim 13 wherein said zinc alkyl sulfinate is zinc 1-dodecanesulfinate.

15. A composition according to claim 11 wherein said antioxidant is tetrakis [methylene(3,5-di-t-butyl-4-hydroxyhydrocinnamate)] methane.

16. A composition according to claim 15 wherein the polyamide is poly(hexamethylene adipamide) and the antistatic agent is one prepared by reacting dimethyl terephthalate with a tetrol compound having an ethylene oxide moiety content of about 60 weight percent and a molecular weight of about 20,000, said antistatic agent is present in an amount in the range of about 1 to about 12 weight percent based upon the weight of the polyamide plus antistatic agent, and the composition is a filament which has been dyed with Merpacyl Blue 2GA or Lanasyn Brilliant Red RL.

17. A composition according to claim 15 wherein the polyamide is poly(hexamethylene adipamide), the antistatic agent is one prepared by reacting dimethyl terephthalate with a tetrol compound having an ethylene oxide moiety content of about 40 weight percent and a molecular weight of about 12,500, said antistatic agent being present in an amount in the range of about 1 to about 12 weight percent based upon the weight of the polyamide and the antistatic agent, and said composition is a filament which has been dyed with Merpacyl Blue 2GA or Lanasyn Brilliant Red RL.

18. A composition according to claim 3 which also contains a stabilizing amount of a hindered phenol-type antioxidant.

19. A method according to claim 14 wherein said zinc alkyl sulfinate is present in an amount in the range of about 0.02 to about 2.5 weight percent based on the weight of the polyamide plus the weight of the antistatic agent.

20. A composition according to claim 16 wherein said zinc alkyl sulfinate is zinc 1-dodecanesulfinate.

21. A composition according to claim 20 wherein said antioxidant is added to the melt of said antistatic agent.

22. A composition according to claim 17 wherein said zinc alkyl sulfinate is zinc 1-dodecanesulfinate.

23. A composition according to claim 22 wherein said antioxidant is added to the melt of said antistatic agent.

24. A composition according to claim 18 wherein said zinc alkyl sulfinate is zinc 1-dodecanesulfinate.

25. A composition according to claim 1 wherein said zinc alkyl sulfinate and said antistatic agent are each added separately to said polyamide.

26. A composition according to claim 25 wherein said antistatic agent is employed in an amount in the range of about 1 to about 12 weight percent based upon the weight of the polyamide plus antistatic agent and said zinc alkyl sulfinate is employed in an amount in the range of about 0.02 to about 2.5 weight percent based on the weight of the polyamide plus antistatic agent.

27. A composition according to claim 26 wherein the antistatic agent is one prepared by reacting dimethyl terephthalate with a tetrol compound having an ethylene oxide moiety of about 60 weight percent and a molecular weight of about 20,000, and the zinc alkyl sulfinate is zinc 1-dodecanesulfinate.

28. A composition according to claim 27 wherein included in the ingredients is a hindered phenol-type antioxidant is an amount in the range of about 0.02 to about 2.0 weight percent based on the weight of the polyamide and the antistatic agent.

29. A composition according to claim 28 wherein said antioxidant is tetrakis[methylene(3,5-di-t-butyl-4-hydroxyhydrocinnamate)] methane.

30. A composition according to claim 1 wherein said zinc alkyl sulfinate is employed in an amount in the range of about 0.02 to about 2.5 weight percent based on the weight of the polyamide plus the weight of the antistatic agent and wherein said antistatic agent is employed in an amount in the range of about 1 to about 12 weight percent based on the weight of the polyamide plus antistatic agent.

31. A composition according to claim 30 wherein said zinc alkyl sulfinate is zinc 1-dodecanesulfinate.

32. A composition according to claim 31 wherein included in the ingredients is a hindered phenol-type antioxidant in an amount in the range of about 0.02 to about 2.0 weight percent based on the weight of the polyamide and the antistatic agent.

33. A composition according to claim 32 wherein said hindered phenoltype antioxidant is tetrakis[methylene(3,5-di-t-butyl-4-hydroxyhydrocinnamate)] methane.

34. A composition according to claim 33 wherein said composition is a filament which has been dyed with an acid dye.

35. A composition according to claim 31 wherein said composition is a filament which has been dyed with an acid dye.

36. A method according to claim 12 wherein said zinc alkyl sulfinate is added to said polyamide after said antistatic agent has been added to said polyamide.

* * * * *

UNITED STATES PATENT AND TRADEMARK OFFICE
CERTIFICATE OF CORRECTION

PATENT NO. : 4,059,653
DATED : Nov. 22, 1977
INVENTOR(S) : Ronald D. Mathis; James S. Dix It is certified that error appears in the above-identified patent and that said Letters Patent are hereby corrected as shown below:

On the title sheet, after "[73] Assignee:", for "Phillips Petroleum Company, Bartlesville, Okla." read -- Phillips Fibers Corporation, Greenville, South Carolina --.

Signed and Sealed this

Eighth Day of August 1978

[SEAL]

Attest:

RUTH C. MASON
Attesting Officer

DONALD W. BANNER
Commissioner of Patents and Trademarks